Aug. 7, 1934.  J. C. LINN  1,968,840
AUTOMATIC SLITTING FIXTURE FOR PISTON RINGS
Filed Oct. 11, 1929  4 Sheets-Sheet 1

Inventor
Joseph C. Linn
By Keefer, Hibben, Davis & Macauley Attys.

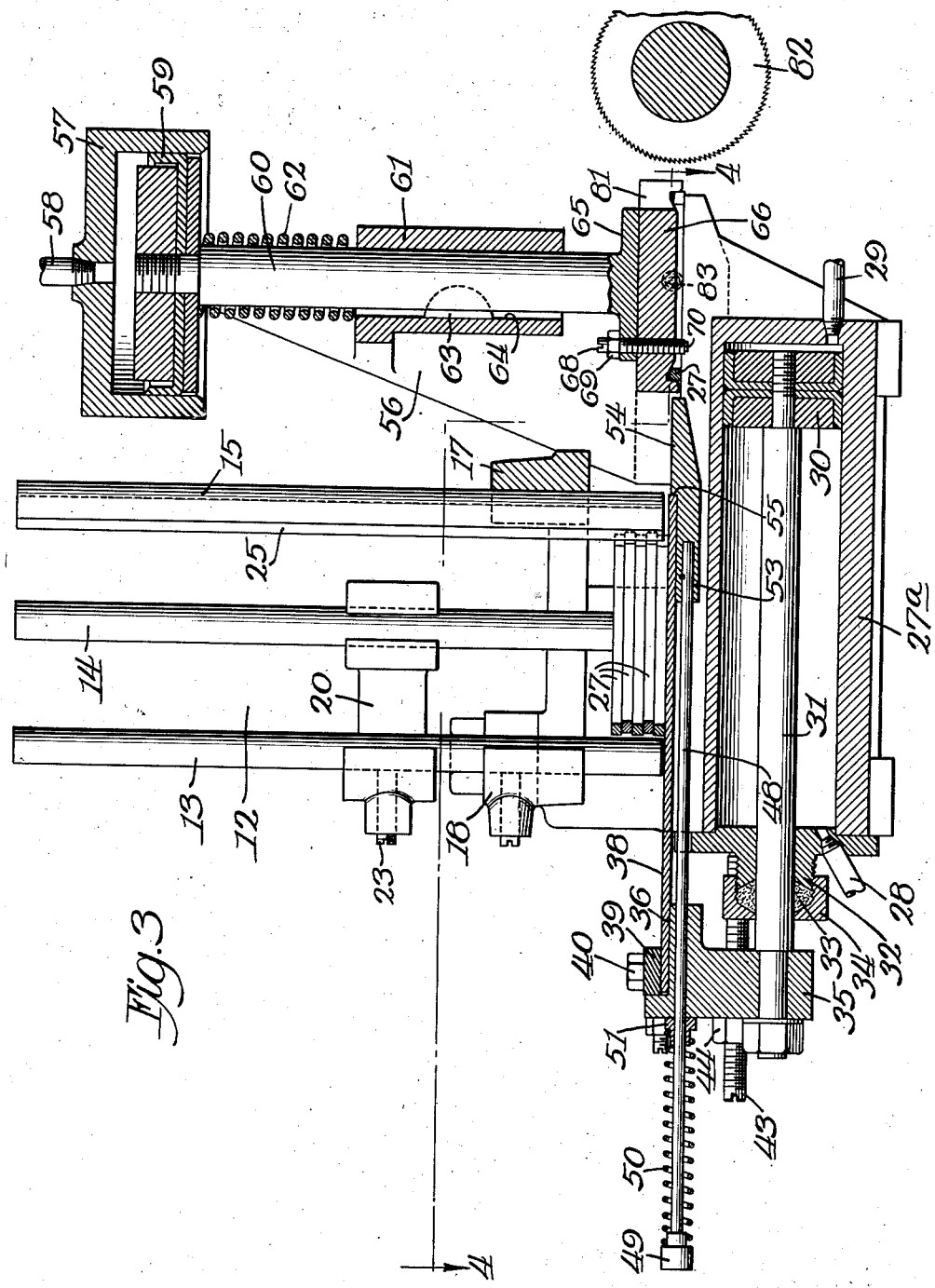

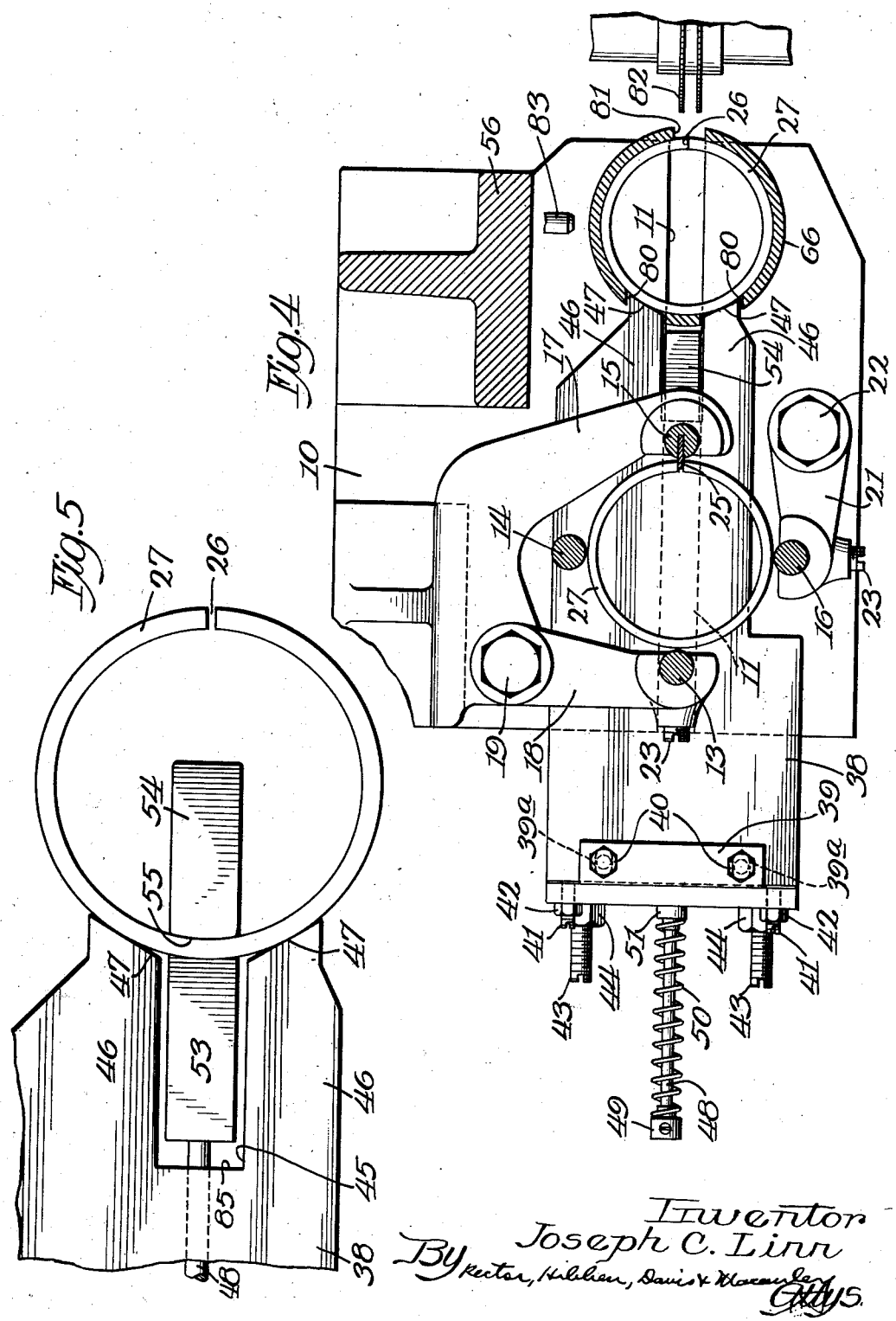

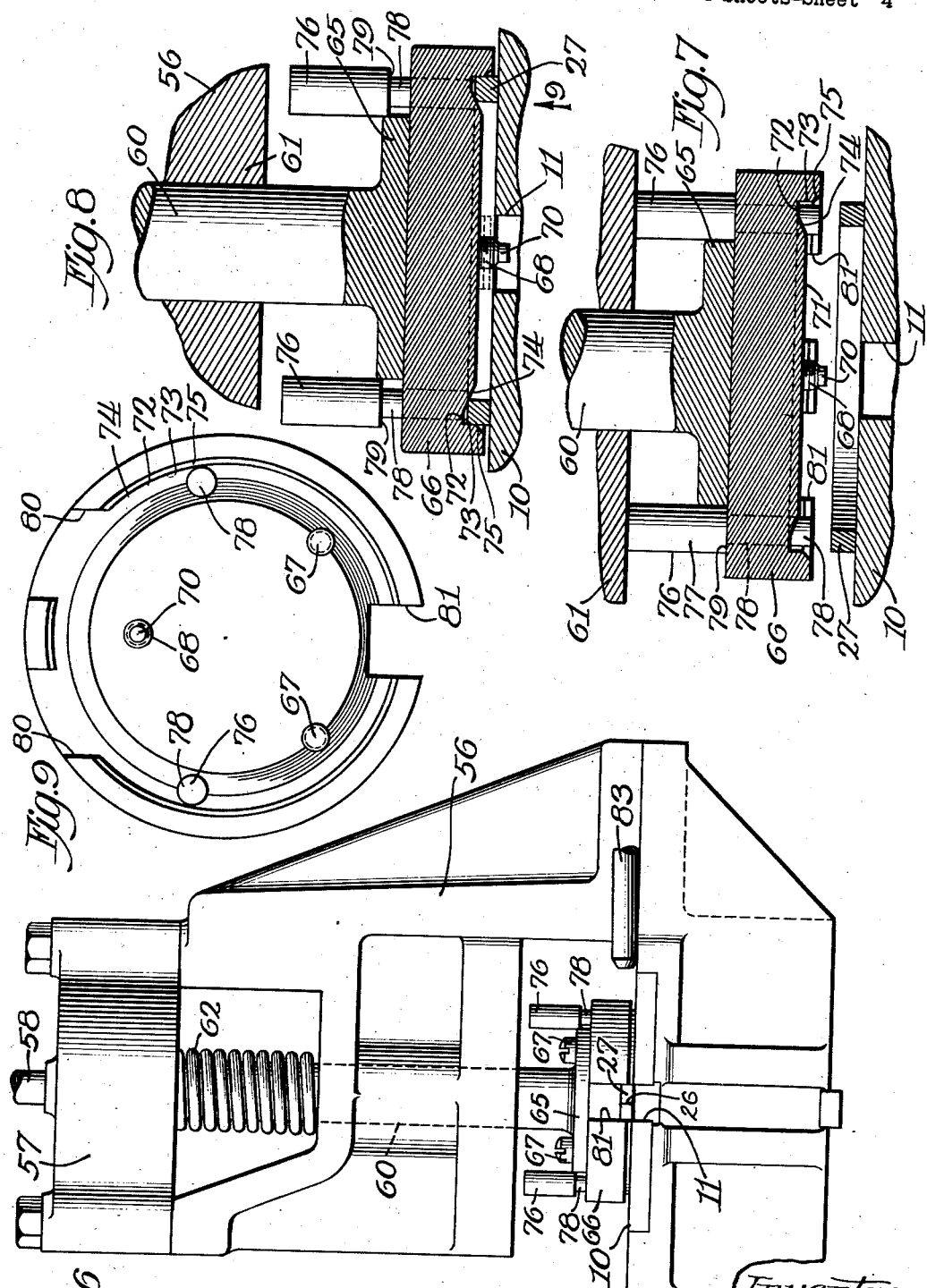

Patented Aug. 7, 1934

1,968,840

UNITED STATES PATENT OFFICE 1,968,840

AUTOMATIC SLITTING FIXTURE FOR PISTON RINGS

Joseph C. Linn, Hagerstown, Ind., assignor to The Perfect Circle Company, Hagerstown, Ind., a corporation of Indiana Application October 11, 1929, Serial No. 398,836

45 Claims. (Cl. 90—21)

My invention relates to automatic slitting fixtures for piston rings.

The principal object of my invention is to devise a fixture which is constructed and arranged to accommodate a plurality of piston rings, and to feed them to a work holder for presentation to the slitting saw.

A further object is to devise a fixture as above described which is characterized by an entirely automatic mode of operation in respect of the transfer of a ring from the magazine to registration with the work holder for the slitting operation, a positioning of the ring in the holder, a release of the transfer mechanism for return to the magazine, and a release of the ring from the work holder.

A further object is to devise a slitting fixture of the character described for previously slitted piston rings, which is specially arranged to insure the correct presentation of the slitted portion of the ring to the cutting saw.

A further object is to provide a slitting fixture of the type set forth which is comparatively simple in construction and operation, requires few parts, is adjustable to rings of different sizes, and which is capable of a high rate of production.

My invention is more particularly directed toward the devising of a mechanism for automatically feeding previously slitted rings to a suitable position for presentation to a cutting saw for effecting a rough or finished slit, or generally, a succeeding slit of some kind. According to the practice of the disclosure of the present application, it is unnecessary to apply the piston ring manually to a chuck, or work holder, for slitting, but they may be assembled in numbers in a magazine and abstracted therefrom, transferred to and gripped in a suitable holder, and slitted by an arrangement of mechanism which is free from any requirement for manual handling, except possibly the loading of the magazine. The rings are handled from one position to another on the fixture by simple, direct and rapid movements. Hence, the fixture will function with a minimum of oversight and under the direction of substantially unskilled labor, with a consequent reduction in labor cost.

These and further objects of my invention will be set forth in the following specification, reference being had to the accompanying drawings, and the novel means by which said objects are effectuated will be definitely pointed out in the claims.

In the drawings:

Fig. 3 is a sectional view similar to Fig. 1, but showing the transfer mechanism in partially extended position after having transferred a piston ring and with the ring transferred in operative position in the work holder;

Fig. 4 is a section along the line 4—4 in Fig. 3, looking in the direction of the arrows;

Fig. 5 is an enlarged plan view of one end of the transfer mechanism, as viewed in Fig. 4, showing the manner in which a piston ring is gripped by the jaws of the mechanism for transfer;

Fig. 6 is an end view of the fixture, looking in the direction of the arrow 6 in Fig. 1;

Fig. 7 is an enlarged sectional view of a portion of the work holder, looking in the direction of the arrow 6 in Fig. 1, and showing the relation of the holder just prior to engaging a ring;

Fig. 8 is a sectional view of the work holder similar to that shown in Fig. 7, but showing the holder in fully engaged position with a ring;

Fig. 9 is a view of the underside of the work holder, looking in the direction of the arrow 9 in Fig. 8.

Figures 1, 2:
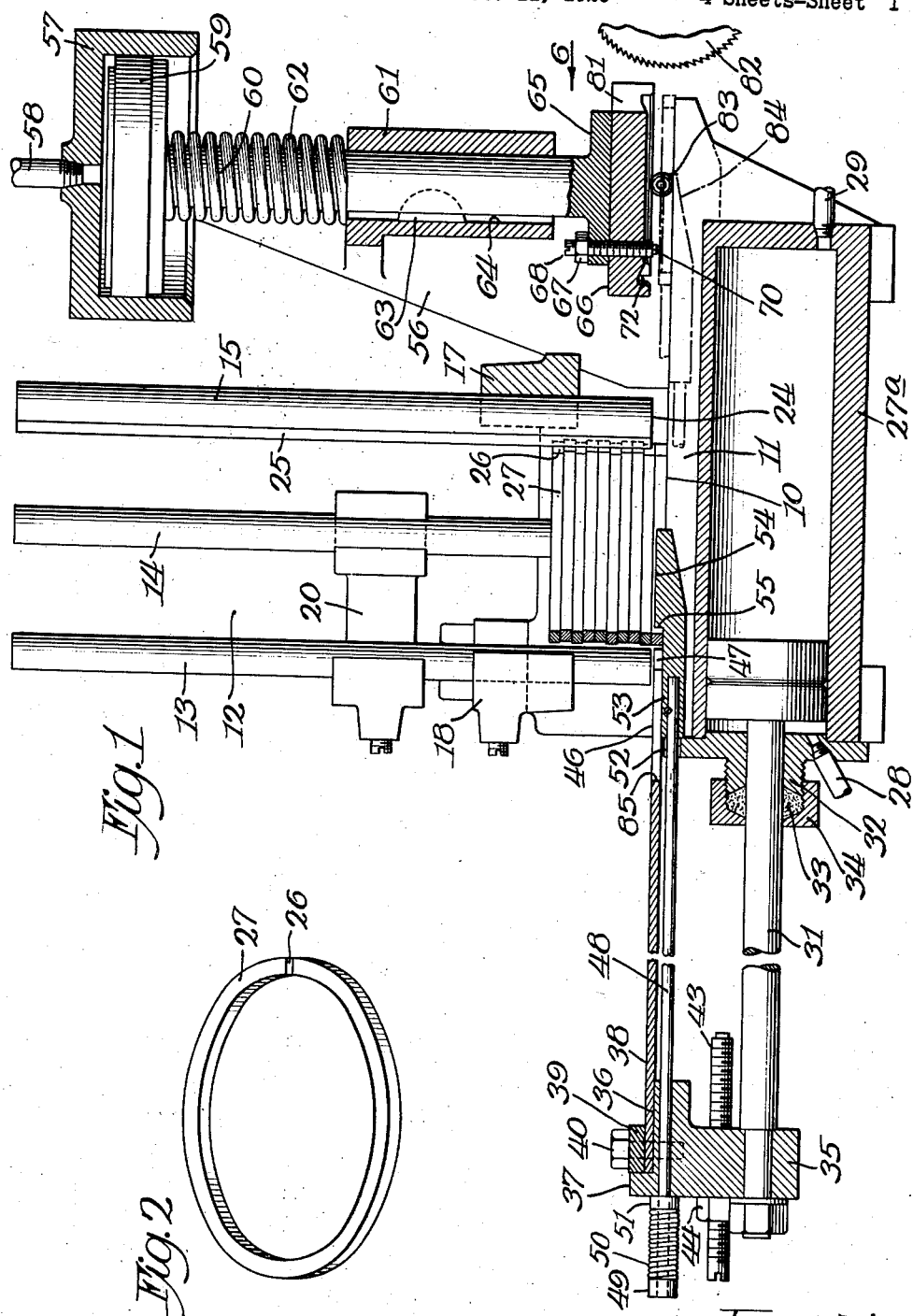
Figure 1 is a sectional elevation of my improved slitting fixture, showing the transfer mechanism in retracted position and in readiness to transfer a piston ring from the magazine to registration with the work holder as a preliminary to the slitting operation.
Fig. 2 is a perspective view of a piston ring, previously slitted, which is handled in the fixture.

The numeral 10 represents the table of my improved fixture having a channel opening 11 running from side to side of the table, as viewed in Figs. 1 and 4, for a purpose hereinafter explained. Extending upwardly from one portion of the table 10 is a ring magazine 12 which is composed of a plurality of rods, or standards 13, 14, 15 and 16. The rod 15 is carried on the end of an arm 17 which rises upwardly from the table 10 and is disposed at one end of the diameter of a ring enclosed by the magazine. Similarly, the rod 13 is carried at one end of an arm 18 which is pivotally mounted as at 19 on the arm 17, the rod 13 being positioned in opposite relation to the rod 15, so that both of said rods are arranged along the same diameter of a ring. The rod 14 is carried at one end of an arm 20 whose other arm is supported in any approved manner, but preferably in adjusted relation, by the rod 13.

The rod 16 is carried at one end of an arm 21 whose other end is pivotally supported as at 22 on the table 10. The rods 14 and 16 are disposed at the opposite extremities of the diameter of a ring, which diameter is normally disposed to that which is in alignment with the rods 13 and 15. Accordingly, the several rods of the ring magazine 12 will define through their inner, or facing, surfaces a substantially circular profile and consequently, a simple and effective pocket, or magazine, for the reception of a stack of rings. The pivotal mounting of the arms 18 and 21 which support, respectively, the rods 13 and 16 permit an easy adjustment of the internal diameter of the magazine for accommodation to varying sizes of rings. Preferably, the several rods will be adjustably carried in the ends of their several arms through the medium of suitable set screws, such as 23, and the lower ends of said rods will all be spaced from the top surface of the table 10 for a purpose hereinafter explained. For the present, it may be particularly noted that the spacing of the lower end of the rod 15 from the top surface of the table 10 is greater than that for the other rods, being a distance which is greater than the thickness of a single ring, but less than the thickness of two rings, the purpose of this special disposition being hereinafter explained. The rod 15 carries a fin 25 along the entire length thereof which extends inwardly toward the center of the magazine and is positioned in alignment with the rods 13 and 15 for insertion in the slit 26 of a piston ring 27. Accordingly, when a stack of the rings 27 is formed within the magazine 12, the slits 26 of the entire stack will be in substantial alignment, with the slit of each ring facing toward the right, as viewed in Fig. 1, for a purpose hereinafter explained.

The piston rings are abstracted singly from the ring magazine heretofore described and transferred into registration with a work holder preliminary to the slitting operation, and the mechanism for effecting this abstraction and transfer will now be described.

A cylinder 27ª is disposed beneath the table 10 and pipes 28 and 29 communicate with the interior of said cylinder through the opposite ends thereof for admitting any suitable fluid pressure thereto. A double acting piston 30 has a sliding movement within the cylinder 27ª and the piston rod 31 of the piston 30 extends through one end of the cylinder 27ª with bearing contact on a suitable bearing 32 which is sealed by the usual packing 33 that is compressed by a packing nut 34. A carriage 35 is secured to the end of the rod 31, opposite to the piston 30, and extends upwardly above said rod. The top portion of the carriage 35 is recessed as at 36 to form a shoulder 37 and one end of a plate 38 rests on the top surface of the recess 36. The end of the plate 38 which rests on the carriage 35 is provided with a pair of spaced, elongated holes 39ª and said plate is secured in position on said carriage through the medium of a clamping bar 39 which extends across both of the holes 39ª and is held against said plate by a pair of clamping screws 40 which extends through said bar and said plate and are threaded into the carriage 35. As a means of adjusting the position of the plate 38, so that the jaws thereof, hereinafter described, may properly coact with the outer, peripheral surface of a piston ring, adjusting screws 41 are threaded through the shoulder 37 for engagement with the end of the plate 38 and said screws are locked in any desired adjusting position by the nuts 42. Additional adjusting screws 43 are threaded through the carriage 35 and are locked in any desired position by nuts 44. The inner, or right, ends of the screws 43 contact with the adjacent end of the cylinder 27ª to limit the movement of the carriage 35 in the same direction, and consequently the travel of the transfer mechanism as hereinafter described.

The opposite end of the plate 38 rests on the top surface of the table 10 and is bifurcated inwardly as at 45 from said end to form a pair of arms 46 having inclined end faces 47 which are disposed in converging relation in the direction of the bifurcation 45. The bifurcation 45 is aligned with the channel 11 which extends across the table in the same direction, but is of a slightly greater width than said channel. As shown in Fig. 1, the end faces 47 of the arms 46 are positioned close to, but spaced from the outer peripheral surface of the lowermost ring of the stack in the magazine.

A rod 48 slides freely through the carriage 35 below the plate 38 and the extremity of said rod, to the left of said carriage as viewed in Fig. 1, carries a collar 49. A coil spring 50 is mounted on the rod 48 between the fixed collar 49 and a sliding collar 51 also fixed on said rod and normally contacting with the adjacent, vertical face of the carriage 35. The opposite end of the rod 48 passes between a pair of projections 52 on the table 10 which limit the lateral movement of said rod, but otherwise does not have any bearing contact therewith. The adjacent extremity of said rod is fixed in a finger 53, a portion of whose upper surface is substantially in alignment with the lower surface of the plate 38 for a purpose hereinafter explained, with the remaining portion 54 disposed thereabove to form a shoulder 55. As shown clearly in Fig. 5 the end edges 47 of the arms 46 and the shoulder 55 of the finger 53 function substantially as gripping jaws, said edges engaging the outer peripheral surface of a ring and said shoulder engaging the inner peripheral surface thereof. The height of the shoulder 55 is substantially the same as the thickness of the plate 38 and the width of the finger 53 is less than the channel 11 and is also less than the width of the bifurcation 45, so that the portion 54 of said finger may slide freely in either of these regions. As shown in Fig. 1, the shoulder 55 is spaced from the inner peripheral surface of the lowermost ring in the stack of the magazine, similar to the spacing of the end edges 47, thereby facilitating and insuring the dropping of successive rings into proper, operative relation with said edges and shoulder.

The transfer mechanism just described abstracts a single ring from the magazine and transfers the same into registration with a work holder which thereafter grips the ring for presentation to a cutting saw. The details of the work holder and the operative mechanism therefor will now be described.

A bracket 56 extends upwardly from the table 10 and supports on the upper end thereof a cylinder 57 to which is connected one end of a fluid supply pipe 58 for delivering fluid pressure to the interior of said cylinder and above a single acting piston 59 disposed therein. The piston rod 60 extends downwardly from the piston 59 and is slidably mounted in a bearing 61 provided on the bracket 56. A coil spring 62 encircles the rod 60 between the underside of the piston 59 and the upper end of the bearing 61 in order to return the piston 59, after its downward movement as hereinafter described, to the position shown in Fig. 1. The piston rod 60 is limited to a reciprocatory movement in the bearing 61 by means of a key 63 which is seated in said rod and extends beyond the periphery thereof for engagement with the walls of a slot 64 formed in the bearing 61.

The lower end of the piston rod 60 is flanged as at 65 below the bearing 61 and a work holder 66 in the form of a disk is attached to said flange by means of cap screws 67 and an adjusting screw 68 which is locked in any predetermined position by means of a lock nut 69. The adjusting screw 68 extends completely through the work holder 66 and has formed on the lower end thereof a nose 70 which is disposed below the under surface of the work holder for engagement with the portion 54 of the finger 53 in a manner and for a purpose hereinafter explained.

The under surface of the work holder 66 is concentrically recessed as at 71 and is further bored around the periphery of said recess to form an annular groove 72, the outer peripheral face of which has a diameter substantially equal to that of the compressed ring for a purpose hereinafter explained. A portion of the face 73 is beveled outwardly as at 75 and the opposite face 74 of the groove 72 is beveled inwardly toward the base of the recess 71, both of said beveled surfaces being provided for purposes hereinafter explained.

The work holder 66 also carries a pair of extractor pins 76, each pin having a portion 77 which is disposed above the top surface of the work holder 66 and a portion 78 which extends downwardly through said holder for registration and contact with the upper surface of a piston ring. Each pin 76 is circular in cross-section, but the portion 77 has a larger diameter than the portion 78, so that the junction of said portions form a shoulder 79 which contacts with the top surface of the work holder 66 to prevent a downward disengagement of the pins from said holder. Owing to their free movability in the work holder 66, said holder and pins are capable of relative movement, occasioned by the movement of said holder and the contact of the lower end of the portion 78 with the piston ring or the contact of the upper end of the portion 76 with the lower end of the bearing 61, said bearing and ring constituting limiting stops to the movement of the extractor pins 76 and serving to extract the piston ring from the work holder 66 in a manner hereinafter explained. A portion of the under surface of the work holder 66, adjacent the magazine 12, is cut away as at 80 to provide a pair of spaced channels for clearing the arms 46 of the plate 38 in the operation of transferring a piston ring into registration with said holder. The holder 66 is likewise slotted on the opposite side thereof, as at 81, to facilitate the application of a cutting saw 82 to the ring in the holder 66. A nozzle 83, communicating with a suitable source of fluid pressure, may be disposed at one side of the holder 66 for a purpose hereinafter explained.

The operation of my improved slitting fixture will now be explained.

The initial position of the several parts of the fixture are as shown in Fig. 1, the magazine 12 enclosing a stack of piston rings 27 which are supported on the table 10, the transfer mechanism being in retracted position with the gripping edges 47 of the plate 38 and the gripping shoulder 55 of the finger 53 arranged in spaced relation on opposite sides of one portion of the lowermost ring of the stack, and the work holder 66 in raised position from the table 10 awaiting the delivery of a piston ring thereto. In the position of the transfer mechanism just described, it will be observed that the spring 50 is compressed between the collars 49 and 51, the latter collar engaging the left vertical face of the carriage 35, as shown in Fig. 1, with the finger 53 prevented from moving further in a direction toward the left, as viewed in said figure, through engagement of said finger with the portion 52 of the table 10.

Fluid pressure will now be supplied through the pipe 28 to the portion of the cylinder 27ª to the left of the piston 30, thus moving said piston toward the right. The initial movement of the piston 30 moves only the carriage 35 and consequently the arms 46 with their gripping edges 47 toward the outer peripheral face of the lowermost ring of the stack, but the continuing movement of said piston finally grips the indicated portion of the lowermost ring between said edges and the shoulder 55 and moves said ring along the upper surface of the table 10 as a guide toward the right, or in the direction of the work holder 66. The actuation for this movement, so far as the ring is concerned, is delivered through the plate 38 to the ring and against the shoulder 55 to thereby move the finger 53 toward the right. During this abstraction of the lowermost ring of the stack, the plate 38 moves freely beneath the lower ends of the several rods composing the magazine by reason of their spaced relation from the table 10 and as said ring is moved toward the right, the plate 38 takes the place of the ring so displaced and supports the remaining rings of the stack. Further, the special spacing of the lower end of the rod 15 as indicated by the numeral 24, namely a spacing which is greater than the thickness of one ring, but less than the thickness of two rings, permits the lateral movement of only the lowermost ring of the stack, so that the rod 15 in addition functions as a stop to prevent any lateral movement of these remaining rings.

When the piston 30 has reached the limit of its movement toward the right, as viewed in Fig. 1, as determined by the setting of the adjusting screws 43, the admission of fluid pressure through the pipe 28 will be stopped and the end of the transfer mechanism will then occupy the position shown by dotted lines in Fig. 1, as indicated by the numeral 84. The limiting movement in a delivery direction of the transfer mechanism is so arranged as to place the piston ring concentrically disposed with reference to the work holder 66 and in substantial registration with the annular groove 72. In this position, the portion 54 of the finger 53 is directly under the work holder 66 with the arms 46 extending through the clearance channels 80 provided in said holder. By reason of the channels 80 and the recess 71, the work holder 66 is free to move downwardly to engage the transferred ring.

Fluid pressure is now admitted to the pipe 58 to actuate the piston 59 downwardly against the compression of the spring 60, thus correspondingly moving the work holder 66 toward the piston ring. During this movement of the holder 66, the nose 70 of the adjusting screw 68 contacts with the portion 54 of the finger 53 and moves the same downwardly, the slender nature of the rod 48 and the comparatively remote disposition of its support in the carriage 35 from the portion 54 permitting this movement. The portion 54 moves downwardly until the upper edge of the shoulder 55 clears the underside of the ring, at which time the energy in the compressed spring 50 becomes operative to retract the finger 53 to the position shown in Fig. 3, the shoulder 55 engaging with the base 85 of the bifurcation 45 as a stop. Accordingly, the finger 53 is literally dipped beneath the underside of the ring to thereby release the same and is then retracted to one side out of the path of movement of the work holder 66. At this time, fluid pressure may be admitted through the pipe 29 to the interior of the cylinder 27ª on the right of the piston 30 to return the transfer mechanism to the position shown in Fig. 1, or this retractive movement may be delayed until a later time as desired, since the position of the arm 46 does not interfere with the continued actuation of the work holder 66.

The ring having been released from the transfer mechanism as just described, it is now in position for engagement with the work holder which is moving toward it for that purpose. As stated above, the diameter of the face 73 of the annular channel 72 is substantially equal to the compressed diameter of the piston ring. Hence, as the ring lies in an uncompressed condition on the table 10, the diameter thereof will be slightly greater than the diameter across the recess 71 between the faces 73. The compression of the ring is effected through the medium of the beveled surface 75 which engages with the outer and upper peripheral edge of the ring, thus applying a component of the downwardly acting vertical force which actuates the work holder 66 in directions which will compress the ring and facilitate its entrance into the groove 72. The natural "spring" of the ring will cause it to bear with some pressure against the face 73, but in order to increase this pressure and to positively insure the immobility of the piston ring is the function of the beveled surface 74. This surface contacts with the upper and inner peripheral edge of the ring against the table 10 as an anvil, thereby producing a substantially wedging action which adequately seats the ring in the groove 72, so that the ring may now be presented to the cutting saw 82.

The saw may be moved toward the ring in order to effect the necessary cutting, or the fixture may be moved toward the saw, as circumstances dictate, but in any case, upon the completion of the slitting operation, admission of fluid pressures through the pipe 58 will be stopped and the pressure then in the cylinder 57 relieved in any approved manner. The energy stored in the spring 62 will then retract the work holder 66 to the position shown in Fig. 1. In its downward movement toward the ring, the holder 66 finally achieves the position shown in Fig. 8, with the lower ends of the extractor pins 76 resting freely on the top surface of the ring and the shoulder 79 of said pin displaced from the top surface of the holder, as shown clearly in Fig. 8. During the upward movement of the holder 66, as just described, the upper ends of the pins 76 engage with the lower end of the bearing 61 as a stop to thereby prevent continued movement of said pins in an upward direction. The holder 66, however, continues to move under the actuation of the spring 62 until the shoulder 79 of the extractor pins engage with the top surface of the holder 66 and when this contact has been finally established, the lower ends of the pins 76 will have pushed the piston ring out of the groove 72 to the position shown in Fig. 7, which substantially corresponds with its initial position before the final slitting operation. A blast of air may then be admitted through the nozzle 83 to drive the ring to one side of the holder 66 for collection in any approved manner.

Reverting to the action of the transfer mechanism after its deposit of a ring in registration with the holder 66 and the retraction of the finger 53 by the spring 50 to the position shown in Fig. 3, fluid pressure will be admitted through the pipe 29, as before stated and at either of the times indicated, to thereby move the piston 30 toward the left, as shown in Fig. 1. The carriage 35 is thereupon moved in the same direction, carrying with it the plate 38 and also the finger 53 until the left edge of the finger 53, as shown in Fig. 1, contacts with the portion 52, whereupon further movement of the finger 53 in the aforesaid direction is prevented. The carriage 35, however, continues to move under the actuation of the piston 30, until it reaches the limit of its movement in the direction indicated, as shown in Fig. 1, whereupon fluid pressure through the pipe 29 is cut off. During the movement of the carriage 35, after the stoppage of the finger 53, it will be observed that the spring 50 is compressed to thereby place it in position for retracting the finger 53 after the delivery of a ring, as above described.

The operation of the fixture is entirely automatic, requiring no special care of any kind, except an occasional inspection and servicing to maintain the ring magazine 12 in a filled condition. The rings are moved by simple and direct action into registration with the work holder, with the resulting achievement of a high rate of production. The admission to and exhaust of fluid pressure from the cylinders 27ª and 57 may be accomplished manually, or in timed relation mechanically and automatically as desired, but as the means for effecting such movement are old in the art and in and of themselves form no part of my invention, they have not been particularly illustrated or described.

The fixture may be arranged to handle rings of different diameters merely by adjusting the positions of the rods composing the magazine, the position of the screw 43 which limits the movement of the transfer mechanism in the delivering direction, and by the attachment of a work holder having a suitable ring groove diameter to the flange 65. Within the limitations of the fixture, the length of the portion 54 of the finger 53 insures the actuation of the latter to release a ring for gripping by the work holder.

While I have shown one set of elements and combinations thereof for effectuating my improved automatic slitting fixture for piston rings, it will be understood that the same is intended for purpose of illustration only and in nowise to restrict my device to the exact forms and structures shown, for many changes may be made therein without departing from the spirit of my invention.

I claim:

1. A slitting fixture for previously slitted piston rings comprising in combination, a ring magazine having means for maintaining the slits of the contained rings in substantial alignment, a work holder for gripping a ring for presentation to a saw, and means for clamping and transferring a ring from said magazine to said holder.

2. A slitting fixture for previously slitted piston rings comprising in combination, a ring magazine having means for maintaining the slits of the contained rings in substantial alignment, a work holder for gripping a ring for presentation to a saw, means for clamping and transferring a ring from said magazine to a point adjacent said holder, means for releasing said ring, and means for seating said ring in said holder.

3. A slitting fixture for previously slitted piston rings comprising in combination, a ring magazine having means for maintaining the slits of the contained rings in substantial alignment, a work holder for gripping a ring for presentation to a saw, means for clamping and transferring a ring from said magazine into registration with said holder, means for releasing said ring, and means for seating said ring in said holder.

4. A fixture for piston rings comprising in combination, a ring magazine, a work holder for gripping a ring for means adapted to clamp and transfer a ring from said magazine to a point adjacent said holder, means for releasing said ring from the clamping means upon the completion of the transfer comprising a part on said holder engageable with said transferring means during the movement of said holder to gripping position, and means for seating said ring in said holder.

5. A fixture for piston rings comprising in combination, a ring magazine, a work holder for gripping a ring, means adapted to clamp and transfer a ring from said magazine into registration with said holder, means for releasing said ring from the clamping means upon the completion of the transfer comprising a part on said holder engageable with said transferring means during the movement of said holder to gripping position, and means for seating said ring in said holder.

6. A fixture for piston rings comprising in combination, a table, a ring magazine for supporting a stack of rings on said table, a movable work holder for gripping a ring, a pair of members mounted for movement beneath the magazine for clamping in the plane thereof one portion of the lowermost ring of the stack and moving the same along the table as a guide to registration with said holder, means carried by and operable by the movement of said holder to move one of said members out of the plane of the ring to release the same, and means for seating the ring in said holder by the continued movement thereof.

7. A fixture for piston rings comprising in combination, a table, a ring magazine for supporting a stack of rings on said table, a movable work holder for gripping a ring, a pair of members mounted for movement beneath the magazine for clamping in the plane thereof one portion of the lowermost ring of the stack and moving the same along the table as a guide to registration with said holder, an adjusting screw carried by said holder for engaging during the movement thereof with one of said members to move the same out of the plane of the ring for release, and means for seating the ring in said holder by the continued movement thereof.

8. A slitting fixture for previously slitted piston rings comprising in combination, a ring magazine for the reception of a plurality of stacked, slitted rings, means in said magazine for maintaining the slits in substantial alignment, a work holder for gripping a ring for presentation to a saw, and means for clamping and transferring rings singly from said magazine to said holder while maintaining the initial slit disposition of each ring.

9. A slitting fixture for previously slitted piston rings comprising in combination, a ring magazine having means for maintaining the slits of the contained rings in substantial alignment, a work holder for gripping a ring for presentation to a saw, means for abstracting rings singly from said magazine and transferring the same to substantial registration with said work holder comprising a pair of jaws for gripping the ring, and means for retaining the remainder of the rings in said magazine during the movements of said transferring means comprising an extended portion of one of said jaws.

10. A fixture for piston rings comprising in combination, a ring magazine, a work holder for gripping a ring, a pair of clamping means for transferring a ring from said magazine to a point adjacent said holder, means for releasing said ring comprising a part on said holder engageable with one of said clamping means during the movement of said holder to gripping position, and means for retracting said last-named clamping means out of the path of movement of said holder.

11. A fixture for piston rings comprising in combination, a ring magazine, a work holder for gripping a ring, a pair of clamping means for transferring a ring from said magazine into registration with said holder, means for moving said holder to engage said ring, means for releasing said ring from said clamping means comprising a part on said holder engageable with one of said clamping means during the movement of said holder to engaging position, and means for retracting said last-named clamping means out of the path of movement of said holder.

12. A fixture for piston rings comprising in combination, a table, a ring magazine for supporting a stack of rings on said table, a movable work holder for gripping a ring, a pair of members for clamping in the plane thereof one portion of the lowermost ring of the stack and moving the same along the table as a guide to registration with said holder, means carried by and operable by the movement of said holder to move one of said members out of the plane of the ring to release the same, and means for retracting said last-named member out of the path of movement of said holder.

13. A fixture for piston rings comprising in combination, a table, a ring magazine for supporting a stack of rings on said table, a movable work holder for gripping a ring, a pair of members for clamping in the plane thereof one portion of the lowermost ring of the stack and moving the same along the table as a guide to registration with said holder, an adjusting screw carried by said holder for engaging during the movement thereof with one of said members to move the same out of the plane of the ring for release, and means for retracting said last-named member out of the path of movement of said work holder.

14. A fixture for piston rings comprising in combination, a ring magazine, a work holder for gripping a ring, clamping means for transferring a ring from said magazine to a point adjacent said holder, means for releasing said ring comprising a part on said holder engageable with said clamping means during the movement of said holder to gripping position, means for retracting said clamping means to a position adjacent said magazine, and means for separating said clamping means to grip a new ring.

15. A fixture for piston rings comprising in combination, a ring magazine, a work holder for gripping a ring, clamping means for transferring a ring from said magazine into registration with said holder, means for releasing said ring comprising a part on said holder engageable with said clamping means during the movement of said holder to gripping position, means for retracting said clamping means to a position adjacent said magazine, and means for separating said clamping means to grip a new ring.

16. A fixture for piston rings comprising in combination, a ring magazine, a work holder for gripping a ring, a pair of relatively movable clamping members for transferring a ring from said magazine to a point adjacent said holder, means for releasing said ring comprising a part on said holder engageable with one of said members to move the same during the movement of said holder to gripping position, means for retracting said clamping members to a position adjacent said magazine, and means for separating said clamping members to grip a new ring.

17. A fixture for piston rings comprising in combination, a ring magazine, a work holder for gripping a ring, a pair of relatively movable clamping members for transferring a ring from said magazine into registration with said holder, means for releasing said ring comprising a part on said holder engageable with one of said members to move the same during the movement of said holder to gripping position, means for retracting said clamping members to a position adjacent said magazine, and means for separating said clamping members to grip a new ring.

18. A fixture for piston rings comprising in combination, a ring magazine, a work holder for gripping a ring, clamping means for transferring a ring from said magazine to a point adjacent said holder, and means for releasing said ring comprising a part engageable with said clamping means to separate the same during the movement of said holder to gripping position.

19. A fixture for piston rings comprising in combination, a table, a ring magazine for supporting a stack of rings on said table, a movable work holder for gripping a ring, a pair of members for clamping in the plane thereof one portion of the lowermost ring of the stack and moving the same along the table as a guide to registration with said holder, and means carried by and operable by the movement of said holder to move one of said members out of the plane of the ring to release the same.

20. A fixture for piston rings comprising in combination, a table, a ring magazine for supporting a stack of rings on said table, a movable work holder for gripping a ring, a pair of members for clamping in the plane thereof one portion of the lowermost ring of the stack and moving the same along the table as a guide to registration with said holder, and an adjusting screw carried by said holder for engaging during the movement thereof with one of said members to move the same out of the plane of the ring for release.

21. A fixture for piston rings comprising in combination, a table, a ring magazine for supporting a stack of rings on said table, a movable work holder for gripping a ring, clamping means comprising inner and outer jaws mounted for movement beneath the magazine for clamping a limited portion of the inner and outer surfaces of the lowermost ring of the stack and moving the same along the table as a guide to registration with said holder, means carried by and operable by the movement of said holder to move said inner jaw out of the plane of the ring to release the same, and means for seating the ring in said holder by the continued movement thereof.

22. A fixture for piston rings comprising in combination, a table, a ring magazine for supporting a stack of rings on said table, a movable work holder for gripping a ring, clamping means comprising inner and outer jaws mounted for movement beneath the magazine for clamping a limited portion of the inner and outer surfaces of the lowermost ring of the stack and moving the same along the table as a guide to registration with said holder, said inner jaw being located within the periphery of the ring and having an extension, means carried by and operable by the movement of said holder for engaging said extension to move the associated jaw out of the plane of the ring to release the same, and means for seating the ring in said holder by the continued movement thereof.

23. A fixture for piston rings comprising in combination, a table, a ring magazine for supporting a collection of rings placed in abutting relation side by side, a movable work holder for gripping a ring, a pair of members adapted to clamp in the plane thereof one portion of the adjacent ring of the collection as successively presented thereto and moving the same to registration with said holder, said members being relatively movable to release the ring, means carried by and operable by the movement of said holder to move one of said members out of the plane of the ring to release the same, and means for seating the ring in said holder by the continued movement thereof.

24. A fixture for piston rings comprising in combination, a table, a ring magazine for supporting a stack of rings on the table, a work holder for gripping a ring, a pair of members for clamping in predetermined locations the lowermost ring of the stack and moving the same along the table as a guide to substantial registration with the work holder, and means comprising an extended portion of one of said members for retaining the remainder of the rings in the magazine during the transferring and retracting movements of the clamping members.

25. A slitting fixture for previously slitted piston rings comprising in combination, a ring magazine having means for maintaining the slits of the contained rings in substantial alignment, a pair of members for clamping and transferring a ring from the magazine to a predetermined point, one of the members being carried by a slender arm having a remote support, and means for releasing the ring by deflecting the last named member.

26. A fixture for piston rings comprising in combination, a ring magazine, a work holder for gripping a ring, a pair of members for clamping and transferring a ring from the magazine to a point adjacent the holder, one of the members being carried by a slender arm having a remote support, and means for releasing the ring from the member upon the completion of the transfer comprising a part on the holder engageable with the last named member to deflect the same during the movement of the holder to gripping position.

27. A fixture for piston rings comprising in combination, a table, a ring magazine for supporting a stack of rings on the table, a movable work holder for gripping a ring, a pair of members mounted for movement beneath the magazine for clamping in the plane thereof one portion of the lowermost ring of the stack and moving the same along the table as a guide to registration with the holder, one of the members being carried by a slender arm having a remote support, and means carried by and operable by the movement of the holder to move the last named member out of the plane of the ring to release the same, and means for seating the ring in the holder by the continued movement thereof.

28. A fixture for piston rings comprising in combination, a table, a ring magazine for supporting a stack of rings on the table, a movable work holder for gripping a ring, a pair of members mounted for movement beneath the magazine for clamping in the plane thereof one portion of the lowermost ring of the stack and moving the same along the table as a guide to registration with the holder, one of the members being carried by a slender arm having a remote support, an adjusting screw carried by the holder for engaging during the movement thereof the last named member to move the same out of the plane of the ring for release, and means for seating the ring in the holder by the continued movement thereof.

29. A slitting fixture for previously slitted piston rings comprising in combination a ring magazine for the reception of a plurality of slitted, stacked rings, means in the magazine for maintaining the slits in substantial alignment, a work holder for gripping a ring for presentation to a saw, and a pair of members for clamping and transferring rings singly from the magazine to the holder while maintaining the initial slit disposition of each ring, one of the members being carried by a slender arm having a remote support.

30. A slitting fixture for previously slitted piston rings comprising in combination, a ring magazine having means for maintaining the slits of the contained rings in substantial alignment, a work holder for gripping a ring for presentation to a saw, means for abstracting rings singly from the magazine and transferring the same to substantial registration with the work holder comprising a pair of jaws for clamping the ring, one of the jaws being carried by a slender arm having a remote support, and means for retaining the remainder of the rings in the magazine during the movements of said transferring means comprising an extended portion on the other of said jaws.

31. A fixture for piston rings comprising in combination, a table, a ring magazine for supporting a stack of rings on the table, a work holder for gripping a ring, a pair of members for clamping in predetermined locations the lowermost ring of the stack and moving the same along the table as a guide to substantial registration with the work holder, one of the members being carried by a slender arm having a remote support, and means comprising an extended portion on the other of said members for retaining the remainder of the rings in the magazine during the transferring and retracting movements of the members.

32. A fixture for piston rings comprising in combination, a ring magazine, a work holder for gripping a ring, a pair of members for clamping and transferring a ring from the magazine to a point adjacent the holder, one of the members being carried by a slender arm having a remote support, means for releasing the ring comprising a part on the holder engageable with the last named member during the movement of the holder to gripping position, and means for retracting the last named member out of the path of movement of the holder.

33. A fixture for piston rings comprising in combination, a ring magazine, a work holder for gripping a ring, a pair of members for clamping and transferring a ring from the magazine into registration with the holder, one of the members being carried by a slender arm having a remote support, means for moving the holder to engage the ring, means for releasing the ring from the members comprising a part on the holder engageable with the last named member to deflect the same during the movement of the holder to engaging position, and means for retracting the last named member out of the path of movement of the holder.

34. A fixture for piston rings comprising in combination, a table, a ring magazine for supporting a stack of rings on the table, a movable work holder for gripping a ring, a pair of members for clamping in the plane thereof one portion of the lowermost ring of the stack and moving the same along the table as a guide to registration with the holder, one of the members being carried by a slender arm having a remote support, means carried by and operable by the movement of the holder to move the last named member out of the plane of the ring to release the same, and means for retracting the last named member out of the path of movement of the holder.

35. A fixture for piston rings comprising in combination, a table, a ring magazine for supporting a stack of rings on the table, a movable work holder for gripping a ring, a pair of members for clamping in the plane thereof one portion of the lowermost ring of the stack and moving the same along the table as a guide to registration with the holder, one of the members being carried by a slender arm having a remote support, an adjusting screw carried by the holder for engaging during the movement thereof with the last named member to move the same out of the plane of the ring for release, and means for retracting the last named member out of the path of movement of the work holder.

36. A fixture for piston rings comprising in combination, a ring magazine, a work holder for gripping a ring, a pair of members for clamping and transferring a ring from the magazine to a point adjacent the holder, one of the members being carried by a slender arm having a remote support, means for releasing the ring comprising a part on the holder engageable with the last named member to deflect the same during the movement of the holder to gripping position, means for retracting the last named member to a position adjacent the magazine, and means for separating the members to grip a new ring.

37. A fixture for piston rings comprising in combination, a ring magazine, a work holder for gripping a ring, a pair of members for clamping and transferring a ring from the magazine into registration with the holder, one of the members being carried by a slender arm having a remote support, means for releasing the ring comprising a part on the holder engageable with the last named member to deflect the same during the movement of the holder to gripping position, means for retracting the clamping members to a position adjacent the magazine, and means for separating the clamping members to grip a new ring.

38. A fixture for piston rings comprising in combination, a ring magazine, a work holder for gripping a ring, a pair of relatively movable members for clamping and transferring a ring from the magazine to a point adjacent the holder, one of the members being carried by a slender arm having a remote support, means for releasing the ring comprising a part on the holder engageable with the last named member to deflect the same during the movement of the holder to gripping position, means for retracting the clamping members to a position adjacent the magazine, and means for separating the clamping members to grip a new ring.

39. A fixture for piston rings comprising in combination, a ring magazine, a work holder for gripping a ring, a pair of relatively movable members for clamping and transferring a ring from the magazine into registration with the holder, one of the members being carried by a slender arm having a remote support, means for releasing the ring comprising a part on the holder engageable with the last named member to deflect the same during the movement of the holder to gripping position, means for retracting the clamping members to a position adjacent the magazine, and means for separating the clamping members to grip a new ring.

40. A fixture for piston rings comprising in combination, a ring magazine, a work holder for gripping a ring, a pair of members for clamping and transferring a ring from the magazine to a point adjacent the holder, one of the members being carried by a slender arm having a remote support, and means for releasing the ring comprising a part engageable with the last named member to deflect the same during the movement of the holder to gripping position.

41. A fixture for piston rings comprising in combination, a table, a ring magazine for supporting a stack of rings on the table, a movable work holder for gripping a ring, a pair of members for clamping in the plane thereof one portion of the lowermost ring of the stack and moving the same along the table as a guide to registration with the holder, one of the members being carried by a slender arm having a remote support, and means carried by and operable by the movement of the holder to deflect the last named member out of the plane of the ring to release the same.

42. A fixture for piston rings comprising in combination, a table, a ring magazine for supporting a stack of rings on the table, a movable work holder for gripping a ring, a pair of members for clamping in the plane thereof one portion of the lowermost ring of the stack and moving the same along the table as a guide to registration with the holder, one of the members being carried by a slender arm having a remote support, and an adjusting screw carried by the holder for engaging during the movement thereof with the last named member to move the same out of the plane of the ring for release.

43. A fixture for piston rings comprising in combination, a table, a ring magazine for supporting a stack of rings on the table, a movable work holder for gripping a ring, clamping means comprising inner and outer jaws mounted for movement beneath the magazine for clamping a limited portion of the inner and outer surfaces of the lowermost ring of the stack and moving the same along the table as a guide to registration with the holder, the inner jaw being carried by a slender arm having a remote support, means carried by and operable by the movement of the holder to move the inner jaw out of the plane of the ring to release the same, and means for seating the ring in the holder by the continued movement thereof.

44. A fixture for piston rings comprising in combination, a table, a ring magazine for supporting a stack of rings on the table, a movable work holder for gripping a ring, clamping means comprising inner and outer jaws mounted for movement beneath the magazine for clamping a limited portion of the inner and outer surfaces of the lowermost ring of the stack and moving the same along the table as a guide to registration with the holder, the inner jaw being located within the periphery of the ring and carried by a slender arm having a remote support, means carried by and operable by the movement of the holder for engaging an extended portion on the jaw to move the same out of the plane of the ring to release the latter, and means for seating the ring in the holder by the continued movement thereof.

45. A fixture for piston rings comprising in combination, a table, a ring magazine for supporting a collection of rings placed in abutting relation side by side, a movable work holder for gripping a ring, a pair of members adapted to clamp in the plane thereof one portion of the adjacent ring of the collection as successively presented thereto and moving the same to registration with the holder, one of the members being carried by a slender arm having a remote support, means carried by and operable by the movement of the holder to deflect the last named member out of the plane of the ring to release the same, and means for seating the ring in the holder by the continued movement thereof.

JOSEPH C. LINN.